United States Patent
Uchida

(10) Patent No.: US 6,751,734 B1
(45) Date of Patent: Jun. 15, 2004

(54) AUTHENTICATION EXECUTING DEVICE, PORTABLE AUTHENTICATION DEVICE, AND AUTHENTICATION METHOD USING BIOMETRICS IDENTIFICATION

(75) Inventor: Kaoru Uchida, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/531,746

(22) Filed: Mar. 21, 2000

(30) Foreign Application Priority Data

Mar. 23, 1999 (JP) .......................................... 11-077697

(51) Int. Cl.⁷ .............................................. G06F 1/24
(52) U.S. Cl. ...................... 713/186; 713/182; 713/168; 713/200; 713/201
(58) Field of Search ................................ 713/186, 182, 713/168, 200, 201

(56) References Cited

U.S. PATENT DOCUMENTS

| | | | | | |
|---|---|---|---|---|---|
| 4,890,323 A | * | 12/1989 | Beker et al. | ................... | 705/67 |
| 4,941,173 A | * | 7/1990 | Boule et al. | ................. | 713/155 |
| 5,872,849 A | * | 2/1999 | Sudia | ......................... | 713/175 |

FOREIGN PATENT DOCUMENTS

| | | |
|---|---|---|
| EP | 0379333 | 7/1990 |
| EP | 0758776 | 2/1997 |
| EP | 0 786 745 | 7/1997 |
| JP | 61-3254 | 1/1986 |
| JP | 63-191695 | 8/1988 |
| JP | 5-75598 | 3/1993 |
| JP | 6-187290 | 7/1994 |
| JP | 7-306831 | 11/1995 |
| JP | 11-25246 | 1/1999 |

OTHER PUBLICATIONS

Japanese Office Acted issued Mar. 6, 2002 (English translation of relevant portion).
Japanese Office Acted issued Jun. 18, 2003 (English translation of relevant portion).
Automated Fingerprint Identification by Minutia–Network Feature—Feature Extraction Processes—D–11 vol. J72–D–11 No. 5 pp. 724–732 1989.
Automated Fingerprint Identification by Minutia–Network Feature—Feature Matching Processes—D–11 vol. J72–D–11 No. 5 pp. 733–740 1989.
SA 17.7: A Robust, 1.8V, 250µW, District Contact 500dpi Fingerprint Sensor—USSCC98/Session 17/Sensor Technology/Paper 17.7.

* cited by examiner

Primary Examiner—Thomas R. Peeso
(74) Attorney, Agent, or Firm—Dickstein, Shapiro, Morin & Oshinsky, LLP.

(57) ABSTRACT

An authentication method using biometrics identification, comprising the following steps of: identifying a user by biometrics entered from a portable authentication terminal; when the user has been registered previously, establishing communication between the authentication terminal and an authentication executing device independent of the authentication terminal, and calculating a common secret key for use in transmission of an authentication message; encrypting an authentication message including the user's inherent information in the authentication terminal based on the secret key; sending the encrypted authentication message from the authentication terminal to the authentication executing device; and decrypting the authentication message in the authentication executing device based on the calculated secret key, thereby executing an operation depending on the user. inherent information included in the message.

36 Claims, 6 Drawing Sheets

AUTHENTICATION EXECUTING DEVICE, PORTABLE AUTHENTICATION DEVICE, AND AUTHENTICATION METHOD USING BIOMETRICS IDENTIFICATION

BACKGROUNDS OF THE INVENTION

1. Field of the Invention

The present invention relates to an authentication executing device, a portable device for authentication, and an authentication method for certifying a user's identity through the check of biometrics, that is, his or her physical features such as fingerprints that can be measured, thereby to allow the operation executable only by the user himself or herself.

2. Description of the Related Art

The operations executable only by a user himself or herself in an information processing system, for example, in a personal computer (hereinafter, referred to as a PC) include a log-in operation of the identified user, electronic commerce of dealing with a person in confirmation of the person's identity, and further file encryption and decryption.

In the conventional technique, a user's input of a password certifies that a person trying to do the above operation is the authorized user. In this case, a person asking for a permission has a trouble to register his or her predetermined password in advance, and if the password should be stolen, another user will make fraudulent use of the PC, acting like the authorized user.

In order to solve the problem, a method of using biometrics such as fingerprints, instead of a password, has been proposed. Below the description will be made with reference to FIG. 7, by way of example, in the case of using fingerprints as the biometrics.

In the conventional technique, a fingerprint sensor 10 is connected to a PC; feature information for matching extracted from the user's fingerprint data is stored in a user inherent information storing unit 13 within the PC; when some fingerprint is provided by a user's input, a fingerprint feature extracting unit 11 extracts the feature information from the fingerprint; a fingerprint checking unit 12 judges whether the feature of the fingerprint is in accord with the stored data; only when they are of one accord, the user is certified as the authorized user and a user inherent operation executing unit 17 performs the user identification operation.

In this form, since the input image and feature information of the fingerprint is processed within a system performing authentication, there is a risk that the feature information may be stolen by tampering the program when the system is not under the control of a user. In order to solve the problem, there has been a method of holding the fingerprint feature information stored in the user inherent information storing unit 13 in FIG. 7, on a portable terminal carried by a user, under the control of the user, more specifically, on an information terminal such as an electronic notepad, or on the medium, for example, an IC card, and transferring the content thereof to a PC to check the data. Even in this way, however, when a fingerprint sensor is connected to a PC in poor management, there is a possibility of tampering a program for controlling fingerprint input, so as to act like an authorized user, as if the authorized user had entered the fingerprint through the finger sensor, by using the fingerprint image of the other person being copied and stored, or the fraudulent fingerprint image.

On the other hand, the above portable terminal that can be carried by a user has the advantage that the user's identity can be checked at any place. However, it is troublesome to insert the terminal into a PC, or connect the terminal to a PC by a cable in order to do authentication operation. There is a method of using infrared rays, radio waves, sound waves, or the like in a non-contact way, so to exchange data therebetween. These signals, however, are easily intercepted, and there is the possibility that the other person, receiving the data signal, makes use of it again so as to act like the authorized user.

SUMMARY OF THE INVENTION

An object of the present invention is to provide an authentication method and system with high security, free from a trouble of remembering a password and a risk of the other person using a PC by acting like the authorized user, capable of connecting a terminal with the PC by infrared rays, radio waves, or sound waves, taking the portability into consideration, with no possibility of stealing the fingerprint data and making fraudulent use of a message.

According to the first aspect of the invention, an authentication method using biometrics identification, comprising the following steps of identifying a user by biometrics entered from a portable authentication terminal, when the user has been registered previously, establishing communication between the authentication terminal and an authentication executing device independent of the authentication terminal, and calculating a common secret key for use in transmission of an authentication message, encrypting the authentication message including the user's inherent information based on the secret key in the authentication terminal, sending the encrypted authentication message from the authentication terminal to the authentication executing device, and decrypting the authentication message based on the calculated secret key in the authentication executing device, thereby executing an operation depending on the user inherent information included in the message.

In the preferred construction, the communication message is transmitted in one of non-contact typed communications, for example, via infrared rays, radio waves, and sound waves.

In another preferred construction, the user inherent information included in the authentication message includes such secret information as cannot be read out without identification of an authorized user from the biometrics in the authentication terminal.

In another preferred construction, an operation to be executed by the authentication executing device depending on the user inherent information is non-executable operation without identification of an authorized user from the biometrics in the authentication terminal, and therefore a function of authenticating that a person having registered the biometrics previously carries and uses the authentication terminal, is provided.

In another preferred construction, the user inherent information included in the authentication message includes individual information that cannot be read out without identification of an authorized user from the biometrics in the authentication terminal, and using the individual information, the authentication executing device executes the operation depending on the information of a user employing the authentication function.

In another preferred construction, the operation performed by the authentication executing device depending on the user inherent information includes file encryption and decryption, and a secret key for use in this encryption and decryption is to be stored in such a way that the secret key cannot be read out without identification of an authorized user from the biometrics in the authentication terminal.

According to the second aspect of the invention, a portable terminal for authentication using biometrics identification, comprises biometrics image input means for receiving a user's biometrics image, biometrics feature extracting means for extracting biometrics feature for matching from the input biometrics image, user inherent information storing means for storing the biometrics feature and inherent information of the user in pairs, secret key agreeing means for deciding a key for use in encryption of an authentication message between the authentication executing device and the portable terminal, biometrics image checking means for comparing the biometrics image extracted from the user's input biometrics image with the biometrics feature stored in the user inherent information storing means, judging whether the user having entered the biometrics image this time is a registered user or not, and when this user is a registered user, supplying the inherent information stored in pairs with the biometrics image in the user inherent information storing means, authentication message encrypting means for encrypting the user's inherent information by the decided secret key, and communication message sending means for sending a communication message to the authentication executing device.

In the preferred construction, the user inherent information storing means stores the biometrics features and inherent information for a plurality of users, and the biometrics image checking means estimates score indicating similarity of the biometrics images, and judges that the user having entered the biometrics image this time is a registered user when the score is higher than a threshold.

In another preferred construction, the user inherent information storing means stores the biometrics features and inherent information for a plurality of users, and the secret key agreeing means creates any random number, sends the random number to the authentication executing device, and calculates the key by use of a secret formula based on the same random number.

In another preferred construction, the biometrics image checking means estimates score indicating similarity of the biometrics images, and judges that the user having entered the biometrics image this time is a registered user when the score is higher than a threshold, and the secret key agreeing means creates any random number, sends the random number to the authentication executing device, and calculates the key by use of a secret formula based on the same random number.

In another preferred construction, the user inherent information storing means stores the biometrics features and inherent information for a plurality of users, and the secret key agreeing means performs mutual authentication together with the authentication executing device according to a predetermined protocol and countersign prior to deciding the key.

In another preferred construction, the biometrics image checking means estimates score indicating similarity of the biometrics images, and judges that the user having entered the biometrics image this time is a registered user when the score is higher than a threshold, and the secret key agreeing means performs mutual authentication together with the authentication executing device according to a predetermined protocol and countersign prior to deciding the key.

In another preferred construction, the user inherent information storing means stores the biometrics features and inherent information for a plurality of users, and the secret key agreeing means creates any random number, sends the created random number to the authentication executing device, receives the created random number from the authentication executing device, and creates the key by use of the both random numbers.

In another preferred construction, the biometrics image checking means estimates score indicating similarity of the biometrics images, and judges that the user having entered the biometrics image this time is a registered user when the score is higher than a threshold, and the secret key agreeing means creates any random number, sends the created random number to the authentication executing device, receives the created random number from the authentication executing device, and creates the key by use of the both random numbers.

In another preferred construction, the portable terminal communicates with the authentication executing device by one of non-contact typed communications, for example, via infrared rays, radio waves, and sound waves.

In another preferred construction, the portable terminal communicates with the authentication executing device through another terminal.

According to the third aspect of the invention, an authentication system for performing authentication using biometrics identification, comprises a portable terminal and an authentication executing device, the portable terminal includes biometrics image input means for a user's receiving biometrics image, biometrics feature extracting means for extracting biometrics feature for matching from the input biometrics image, user inherent information storing means for storing the biometrics feature and inherent information of the user in pairs, secret key agreeing means for deciding a key for use in encryption of an authentication message between the authentication executing device and the portable terminal, biometrics image checking means for comparing the biometrics image extracted from the user's input biometrics image with the biometrics feature stored in the user inherent information storing means, judging whether the user having entered the biometrics image this time is a registered user or not, and when this user is a registered user, supplying the inherent information stored in pairs with the biometrics image in the user inherent information storing means, authentication message encrypting means for encrypting the user's inherent information by use of the decided secret key, and communication message sending means for sending a communication message to the authentication executing device, the authentication executing device including:

secret key agreeing means for deciding a key for use in encryption of an authentication message between the portable terminal and the authentication executing device, communication message receiving means for receiving a communication message sent from the portable terminal, authentication message decrypting means for decrypting the communication message by use of the decided secret key, and user inherent operation executing means for executing the user inherent operation based on the inherent information decrypted from the communication message.

In the preferred construction, the user inherent information storing means of the portable terminal stores the biometrics features and inherent information for a plurality of users, and the biometrics image checking means estimates score indicating similarity of the biometrics images, and judges that the user having entered the biometrics image this time is a registered user when the score is higher than a threshold.

In another preferred construction, the user inherent information storing means of the portable terminal stores the biometrics features and inherent information for a plurality of users, and the secret key agreeing means creates any random number, sends the random number to the authentication executing device, and calculates the key by use of a secret formula based on the same random number.

In another preferred construction, the biometrics image checking means of the portable terminal estimates score indicating similarity of the biometrics images, and judges that the user having entered the biometrics image this time is a registered user when the score is higher than a threshold, and the secret key agreeing means creates any random number, sends the random number to the authentication executing device, and calculates the key by use of a secret formula based on the same random number.

In another preferred construction, the secret key agreeing means of the authentication executing device calculates the key by use of the same secret formula as that of the portable terminal based on the random number sent from the portable terminal.

In another preferred construction, the secret key agreeing means of the authentication executing device receives the random number from the portable terminal, creates any random number, and creates the key by use of the both random numbers.

According to another aspect of the invention, a computer readable memory storing an authentication program for making a computer perform authentication using biometrics identification, the authentication program comprising a biometrics image input step for a user's receiving biometrics image, a biometrics feature extracting step for extracting biometrics feature for matching from the input biometrics image, a secret key agreeing step for deciding a key for use in encryption of an authentication message between the authentication executing device and the portable terminal, a biometrics image checking step for comparing the biometrics image extracted from the user's input biometrics image with the biometrics feature stored in the user inherent information storing means for storing a pair of the biometrics features and inherent information of the user, judging whether the user having entered the biometrics image this time is a registered user or not, and when this user is a registered user, supplying the inherent information stored in pairs with the biometrics image in the user inherent information storing means, an authentication message encrypting step for encrypting the user's inherent information by use of the decided secret key, and a communication message sending step for sending a communication message to the authentication executing device.

In the preferred construction, the biometrics image checking step of the authentication program estimates score indicating similarity of the biometrics images, and judges that the user having entered the biometrics image this time is a registered user when the score is higher than a threshold, and the secret key agreeing step of the authentication program creates any random number, sends the random number to the authentication executing device, and calculates the key by use of a secret formula based on the same random number.

In another preferred construction, the computer readable memory storing an authentication executing program of the authentication executing device, the authentication executing program making a computer perform a secret key agreeing step for deciding a key for use in encryption of an authentication message between the authentication program and the authentication executing program, a communication message receiving step for receiving a communication message sent from the authentication program, an authentication message decrypting step for decrypting the communication message by use of the decided secret key, and a user inherent operation executing step for executing the user inherent operation based on the inherent information decrypted from the communication message.

In another preferred construction, the secret key agreeing step of the authentication executing program calculates the key by use of the same secret formula as that of the portable terminal based on the random number sent from the portable terminal.

In another preferred construction, the secret key agreeing step of the authentication executing program receives the random number from the authentication program, creates any random number, and creates the key by use of the both random numbers.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, wellknown structures are not shown in detail in order to unnecessary obscure the present invention.

The present invention is to identify a user by the biometrics being entered and perform the stored user inherent operation only when the entered biometrics is in accord with the registered one. Especially, biometrics input and its feature extraction, and checking processing is performed by a terminal that a user carries, and communication between the terminal and an authentication executing device for executing the user's inherent operation is encrypted by a secret key particular to the communication about which the portable terminal and the authentication executing device are agreed, thereby to assure the security in the whole system.

Figure 1:
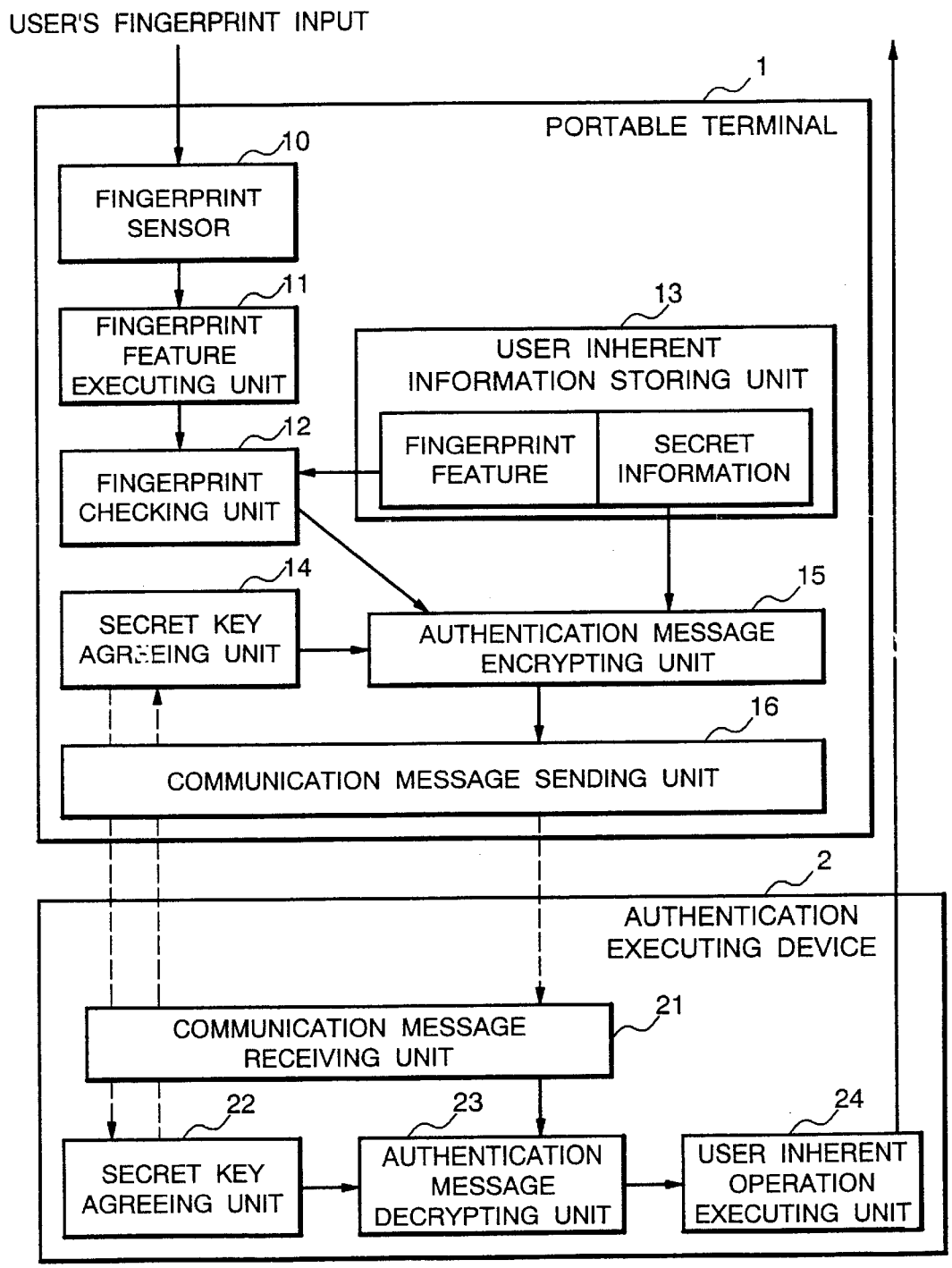
FIG. 1 is a block diagram showing the structure of an authentication system according to an embodiment of the present invention.

With reference to FIG. 1, an authentication system according to a first embodiment of the present invention comprises a portable terminal 1 and an authentication executing device 2.

The portable terminal 1 comprises a fingerprint sensor 10, a fingerprint feature extracting unit 11, a fingerprint checking unit 12, a user inherent information storing unit 13, a secret key agreeing unit 14, an authentication message encrypting unit 15, and a communication message sending unit 16.

The authentication executing device 2 comprises a communication message receiving unit 21, a secret key agreeing unit 22, an authentication message decrypting unit 23, and a user inherent operation executing unit 24.

Figure 2:
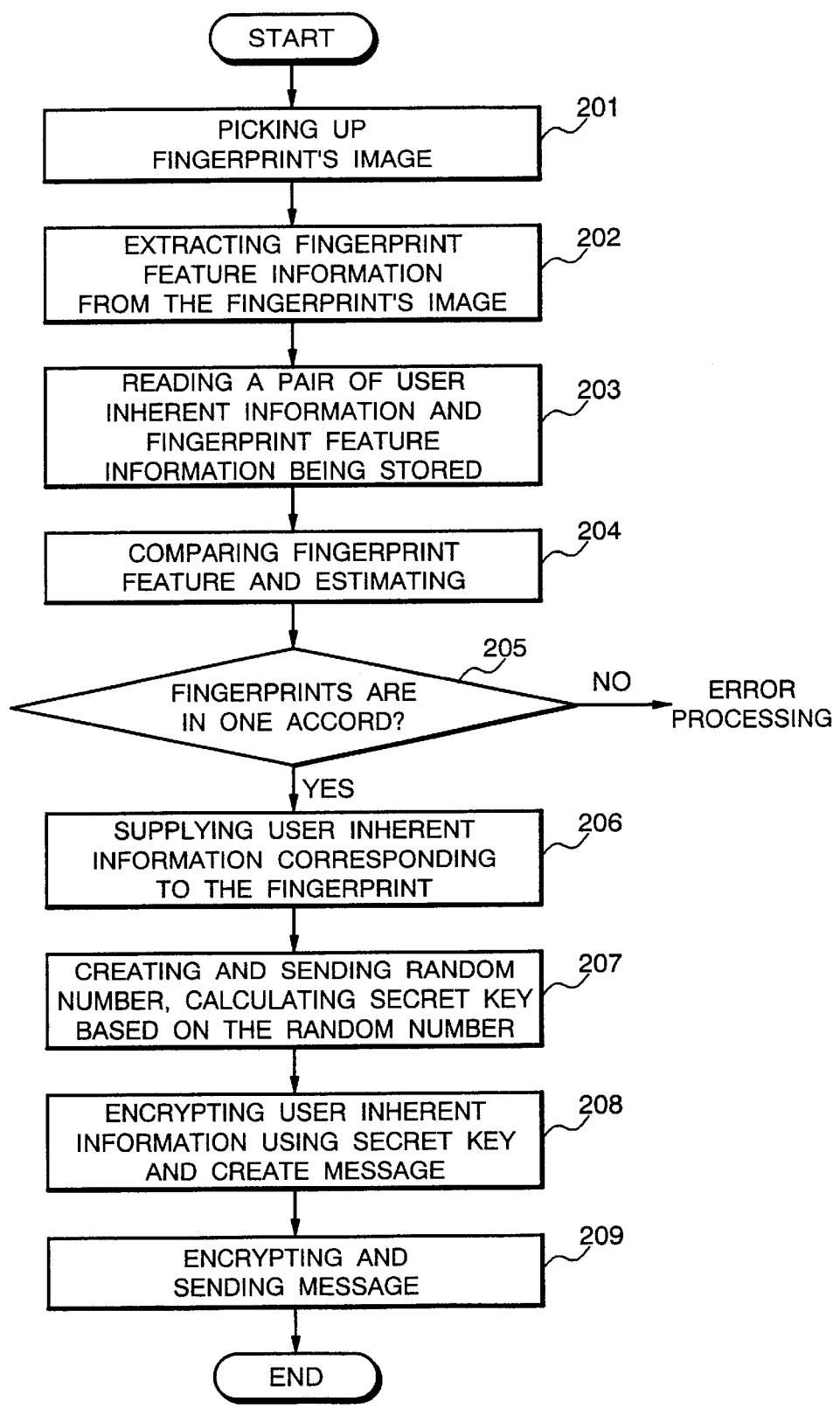
FIG. 2 is a flow chart for use in describing the operation of a portable terminal according to a first embodiment of the present invention.
Figure 3:
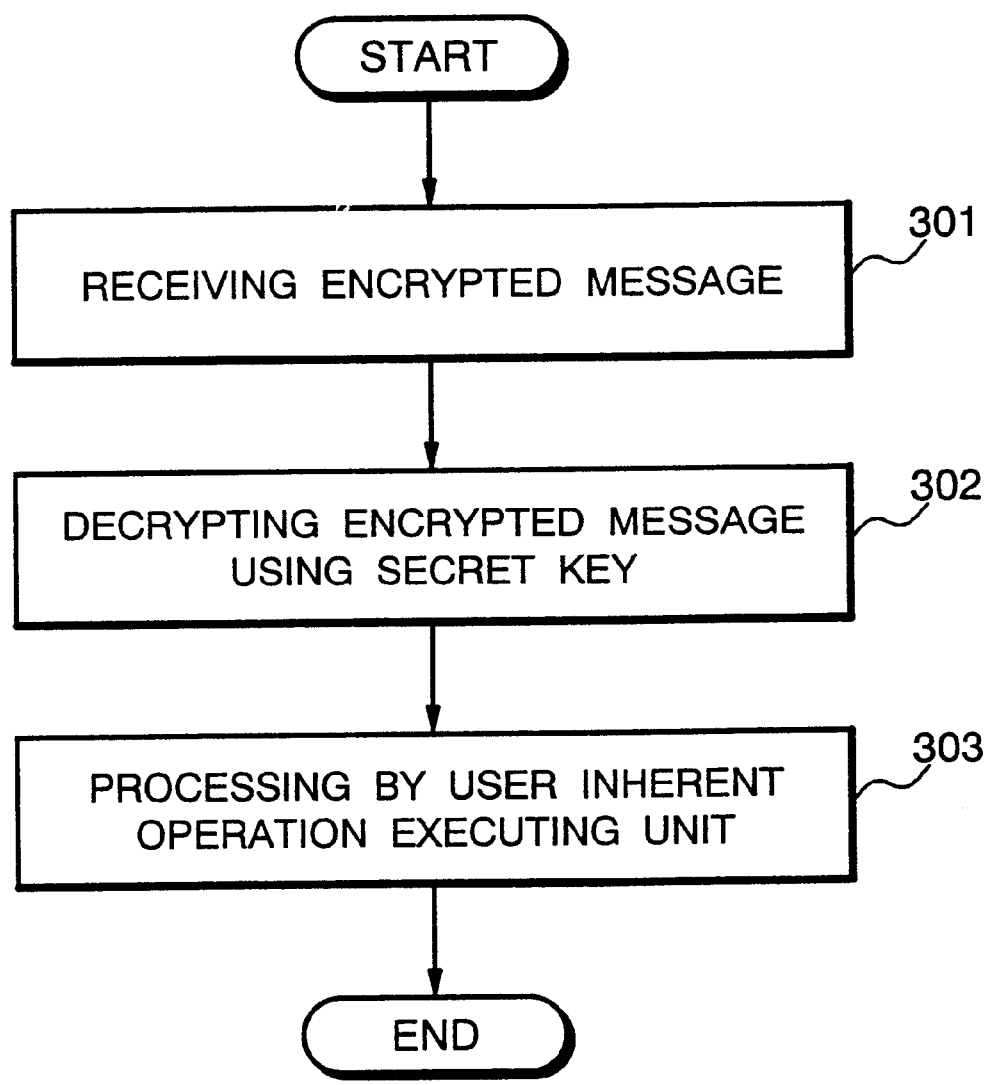
FIG. 3 is a flow chart for use in describing the operation of the authentication executing device according to the first embodiment of the present invention.

Each component of the portable terminal 1 and the authentication executing device 2 will be hereinafter described in accordance with its operation. FIG. 2 is a flow chart showing the operation of the portable terminal 1 and FIG. 3 is a flow chart showing the operation of the authentication executing device 2.

The fingerprint sensor 10 of the portable terminal 1 picks up the fingerprint's image when a finger of a user comes into contact with it, and converts the image data into digital image data suitable to be processed in the fingerprint feature extracting unit 11 (Step 201).

As the structure of the fingerprint sensor 10, such an optical method can be used, that the LED-emitted light is reflected by the prism and the reflected light is converted into digital image by a CCD by making use of difference in the reflection rate between ridges and furrows according to the finger put outside of the reflected surface, thereby to pick up the fingerprint's image. Or, a use of such a fingerprint sensor of the capacitance detecting method, as disclosed in "A Robust, 1.8V, 250 uW, Direct Contact 500 dpi Fingerprint Sensor" (Inglis et al.), IEEE ISSCC98, SA 17.7 pp.284–285 (1998. 2), could realize a thin and small sized fingerprint sensor more suitable for portability. In this capacitance detecting method, by measuring the difference in the capacitance between the ridge portion and the furrow portion having a layer of the air on the surface of a finger coming into contact with the sensor, the figure of the fingerprint is converted into digital image, thereby to pick up the fingerprint's image.

The fingerprint feature extracting unit 11 receives the fingerprint's image obtained by the fingerprint sensor 10 and executes the processing of extracting the feature for use in fingerprint identification from the same image (Step 202).

The feature extracting method includes, for example, a method described in the following articles: "Automated Fingerprint Identification by Minutia-Network Feature—Feature Extraction Processes—" written by Hiroshi Asai, Yukio Hoshino, Kazuo Kichi, The Institute of Electronics, Information and Communication Engineers Transactions, vol.J72-D-II, No. 5, pp. 724–732 (1989.5). Here, the pattern of ridges is extracted from a grayscale image of ridges by the binarization processing and thinning processing, the number of the intersectional ridges on the line interconnecting the end point and the bifurcation is counted after detecting the positional relation between the both points, and the relational view is represented in digital data, which is used as the fingerprint feature to be matched.

The user inherent information storing unit 13 stores the fingerprint feature information of the above format and the corresponding user inherent information (secret information) particular to a user owning the above fingerprint in pairs.

Here, the user inherent information means the data including useful information of various formats on: user's identify, such as unique identifier for identifying a user, and the data which only the user is permitted to access to, for example, a password for use in log-in to a computer, the secret alphabet and numeral string (secret number or password) for identifying a person in the electronic commerce, and the like.

When storing a new pair of the user inherent information and the fingerprint feature information, the user inherent information to be stored is entered from a pen-typed input unit of a portable terminal, the fingerprint of the corresponding user is entered from the fingerprint sensor 10, and the fingerprint feature obtained by the fingerprint feature extracting unit 11 based on the above information is stored in the user inherent information storing unit 13 together with the corresponding user inherent information. The user inherent information storing unit 13 may be designed to store only the fingerprint of one user on the authentication system and his or her secret information, or it may be designed to store the fingerprints of a plurality of users and their secret information in pairs.

The fingerprint checking unit 12 receives the fingerprint feature S obtained from the fingerprint a user entered this time, from the feature extracting unit 11, while the unit 12 reads out and receives a pair of the fingerprint feature information F having been stored so far and the corresponding secret information stored in the user inherent information storing unit 13, from the user inherent information storing unit 13 (Step 203).

The fingerprint checking unit 12 compares the fingerprint feature information F with the fingerprint feature S obtained from the fingerprint entered by the user, and estimates the score of the similarity, the score increasing when the both information is proved to be on the identical finger (Step 204).

By comparing the score with a predetermined threshold, the fingerprint checking unit 12 judges whether the user giving the fingerprint information S is the identical to the registered user or not (Step 205). When the score is higher than the threshold, it results in "fingerprints are in accord" and the unit 12 supplies the secret information corresponding to the fingerprint, to the authentication message encrypting unit 15 (Step 206).

As the method of identifying a person by checking the fingerprints, there is a method disclosed, for example, in the following articles; "Automated Fingerprint Identification by Minutia-Network Feature—Matching Processes—" written by Hiroshi Asai, Yukio Hoshino, Kazuo Kichi, The Institute of Electronics, Information and Communication Engineers Transactions, vol.J72-D-II, No. 5, pp. 733–740 (1989.5). Here, the number of the intersectional ridges on the line interconnecting the end point and the bifurcation of a ridge is counted, digital data represented points are aligned, and thereafter the similarity therebetween is estimated, thereby checking the fingerprints.

The fingerprint feature used in the embodiment assures the stable and correct check results even if there is deviation or distortion between the fingerprints. In the case of the same finger, the above score is extremely high, while in the case of a different finger, the score approaches to zero. Further, the data size is much smaller than the size of the input fingerprint's image, thereby decreasing the arithmetic processing for checking advantageously.

As the result of checking the fingerprints, when the input fingerprint is in accord with the fingerprint feature stored in the user inherent information storing unit 13, the secret information on the user stored in the user inherent information storing unit 13 is supplied to the authentication executing device 2.

This operation will be performed as follows. At first, the secret key agreeing unit 14 creates any random number R that may be the base of the secret key for this communication, and supplies this to the secret key agreeing unit 22 on the side of the authentication executing device 2. For this transmission, infrared communication through the infrared communication ports provided in the both sides is adopted.

The secret key agreeing unit 14 calculates the secret key K for message encryption using the secret calculation formula, based on the supplied random number R (Step 207). As this calculation method, for example, the hash function can be used.

On the other side, the secret key agreeing unit 22 on the side of the authentication executing device 2 also calculates the secret key K for message encryption using the same secret calculation formula, based on the supplied random number R. Namely, this calculation formula is inherent to the both of the portable terminal 1 and the authentication executing device 2 of this authentication system and secret. Therefore, even if the random number R is stolen, it is impossible to calculate the secret key K in the other system.

The authentication message encrypting unit 15 encrypts the secret information of the user who was agreed about the fingerprint matching, received from the user inherent information storing unit 13 by use of the secret key K calculated by the secret key agreeing unit 14, and creates a communication message (Step 208). For example, the secret common key encryption method such as DES is used for this encryption.

The communication message sending unit 16 supplies the encrypted message received from the authentication message encrypting unit 15, to the authentication executing device 2 (Step 209). For this transmission, infrared communication through the infrared communication ports provided in the both sides is adopted, for example.

On the side of the authentication executing device 2, the communication message from the portable terminal 1 is received by the communication message receiving unit 21 (Step 301), which sends the same message to the authentication message decrypting unit 23. The authentication message decrypting unit 23 receives the secret key K having been calculated in secret from the secret key agreeing unit 22, and decrypts the encryption by using the same key as the secret common key (Step 302).

Thus, the secret information stored in the portable terminal 1, which can be referred to only by the input of the correct fingerprint of the authenticated user is sent to the authentication executing device 2 without being stolen. The authentication executing device 2 executes the operation using the secret information in the user inherent operation executing unit 24 (Step 303).

For example, log-in to a computer may be permitted the authorized user, or the content of the secret file of the user himself or herself may be read out and displayed on a display of the authentication executing device 2. Or, the authentication executing device 2 may assure the other information processing system that a user carrying the portable terminal 1 so as to enter the fingerprint is the authorized user.

Further, the alphabet and numeral string for certifying the identity in the electronic commerce may be sent to the electronic commerce trading company connected over a network via the authentication executing device 2.

In the above operations, the secret information stored in the portable terminal 1, which cannot be read out without correct biometrics input, can be sent to the authentication executing device 2 safely, and the authentication executing device 2 can authenticate a user, only when a user entering the fingerprint through the portable terminal 1 is the user having been registered previously.

Further, since the secret key particular to the communication of secret information is used in the secret key agreeing unit 22 by mutual agreement between the portable terminal 1 on the sending party and the authentication executing device 2 on the receiving party, it is impossible for the other person to decrypt the content of the secret information and send the secret information acting like an authorized person, even if intercepting the past communication using the infrared rays to record and reproduce.

In the above description, although a most easy method, such that the secret key agreeing unit 14 creates the random number and sends it to the secret key agreeing unit 22 one-sidedly, has been described, there is a method of mutual authentication between the portable terminal 1 and the authentication executing device 2 while checking the communication party mutually with a predetermined protocol and countersign, in order to enhance the security.

Further, as for the random number, it is created not only by the portable terminal 1 one-sidedly, but the random number R1 may be created by the portable terminal 1 and the random number R2 may be created by the authentication executing device 2, which may be mutually exchanged, and which may be adopted in such a way that the secret common key couldn't be created without the both random numbers in a combined way or added way. This method will provide the more security.

The concrete example of the embodiment will be described this time. The concrete example is taken in the case of log-in authentication to a personal computer (PC). Assume that each user carries his or her own personal terminal 1, where the data of the fingerprint feature of his or her own finger and user name and password for use in log-in as the secret data that is not readable in the ordinal method are stored in the user inherent information storing unit 13. In this case, assume that the PC is the authentication executing device 2, and that the data communication between the portable terminal 1 and the authentication executing device 2 is performed by the infrared rays.

When a user tries to log in to the PC, he or she enters the registered fingerprint to the fingerprint sensor 10 of the portable terminal 1. The fingerprint's image is entered through the sensor 10, feature for matching is extracted by the fingerprint extracting unit 11, and it is compared with the fingerprint feature of the user inherent information storing unit 13 by the fingerprint checking unit 12. When they are in accord, the both parties are agreed about a secret key in the above-mentioned way, and the user name and log-in password encrypted using the key are sent from the portable terminal 1 to the PC. After decrypting the data in the authentication message decrypting unit 23, the PC performs the log-in operation using the user name and log-in password, by way of example of the user inherent operation.

In these operations, only when the correct fingerprint of an authorized user is entered to the portable terminal 1, log-in will be permitted. In this case, a user has no trouble of remembering a password, nor fear of failing to log in because of forgetting the password. Without input of the correct fingerprint, the secret information such as a password cannot be read out and the log-in operation cannot be executed, thereby preventing from the fraudulent log-in.

Further, the terminal is easily portable, and the communication between the terminal 1 and the PC is performed by the infrared rays, with no need of connecting them by a cable and inserting the portable terminal 1 into the PC. Further, it can realize such log-in authentication that even if the infrared communication is intercepted, it is impossible to decode a password because the message is encrypted, and even if the communication content is recorded and reproduced by the other person, it is impossible for the other person to act like an authorized person because a secret key is different in every time.

Although the above description has been made in the case of log-in operation to a PC, when this PC is used, for example, as a user terminal of a system for performing the electronic commerce over a network, the log-in operation can be used for personal identification in the commerce. In this case, the secret information stored in the portable terminal 1 corresponds to the customer identification number of a user and the information for identifying the user such as a personal identification number. The secret information is sent from the portable terminal 1 to the user terminal of the system for performing the electronic commerce, the user terminal sends the information for the personal identification sent from the portable terminal 1, to an authentication host of the electronic commerce after the information is uniquely encrypted depending on the necessity, and the authentication host examines the coincidence between the same information and the information stored therein, thereby to confirm the personal identity.

Further, in this case, the portable terminal 1 carried by a user is preferably designed in the shape of a card rather than a so-called information terminal, from the viewpoint of the portability. A portable authentication card for the communication with a user terminal on the electronic commerce by the infrared rays can be realized by mounting a fingerprint sensor and a chip for calculation and data storing on a card generally called as an IC card where an integrated circuit can be mounted.

Although the above description has been made in the case where the infrared communication is performed between the portable terminal 1 and the authentication executing device 2, it is, of course, possible to use radio waves or ultrasonic instead of the infrared rays. If connecting the portable terminal 1 to the authentication executing device 2 by a cable, or inserting the portable terminal 1 into the authentication executing device 2, or bringing the portable terminal 1 into contact with the authentication executing device 2, in some electric and magnetic means, the basic operation is the same.

Although the above description has been made in the case where each user carries his or her own portable terminal, with only the data of one user stored therein, it is also possible to realize an authentication system in which, with a plurality of fingers and their secret information stored in a portable terminal, if only any registered user enters the fingerprint, only the secret information of the user himself or herself is sent to an authentication executing device. In this case, the fingerprint checking unit 12 N times repeats the operation of comparing the fingerprint feature S obtained from the user's input fingerprint with each fingerprint feature information F stored for N persons, and if finding the fingerprint feature information F having the highest score, the user corresponding to the fingerprint feature S can be specified.

As described above, in the case of a matching algorithm of almost showing the score 0 in the different fingerprints and showing the high score in the same fingerprints without fail, the operation will stop at the time of finding the higher score than a given threshold, without repeating the operation N times, and the fingerprint information F corresponding to the same score can be judged to be matched fingerprint information. When every score proves to be lower than the threshold even if repeating the operation N times, a user can't be specified and a message "impossible to specify" is to be issued.

The above example has been taken in the case where the authentication executing device 2 can be directly communicated with the portable terminal 1 via the infrared rays or the like. Besides, it is possible to realize authentication between the remote machines, with an intermediate terminal put between the portable terminal 1 and the authentication executing device 2.

Figure 4:
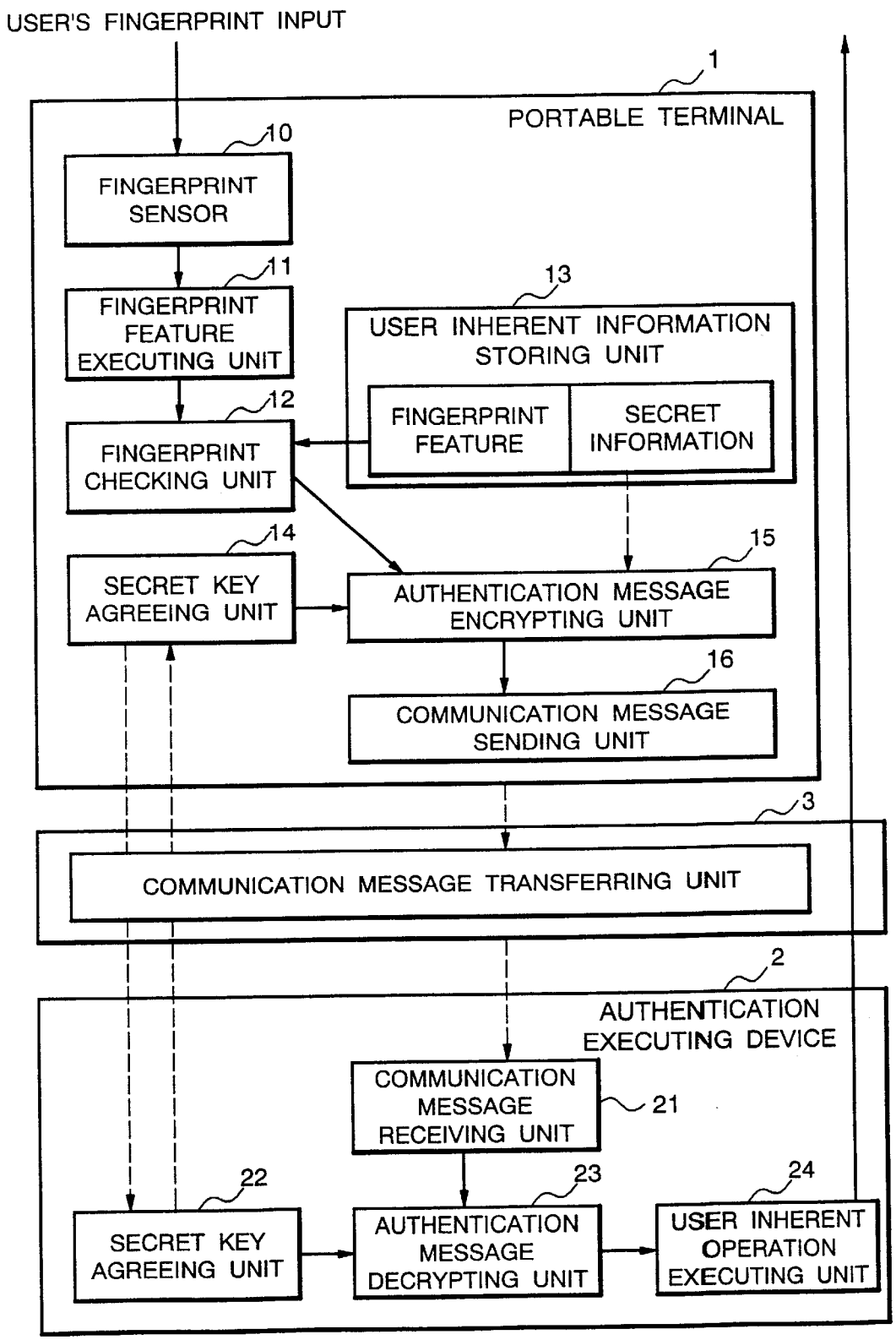
FIG. 4 is a block diagram showing the structure of an authentication system according to the other embodiment of the present invention.

This second embodiment will be described with reference to FIG. 4. This is a variation of the first embodiment. Assume that, in the electronic commerce, a provider of a trading service manages the authentication executing device 2 and a shop or the like manages its set terminal, where a user carries the portable terminal 1, for example, in the shape of IC card, for certifying the identity of a trading member. Here, the user enters his or her fingerprint and certifies that he or she is the authorized user in the same way as mentioned above. The portable terminal 1 and the authentication executing device 2 are agreed about the secret key through the intermediation of a message transferring unit 3 of the set terminal, and the secret information for certifying the authorized identity is sent to the authentication executing device 2 by use of the secret key, thereby realizing the desired authentication.

In this case, the portable terminal 1 is connected to the set terminal directly, or via a cable, or via the non-contact typed communication such as the infrared rays, and the set terminal is connected to the authentication executing device 2 via a telephone line or a network for the exclusive use. The set terminal is only to translate a message without seeing the content thereof, as the intermediate of communication.

In this way, even if there is an intermediate means between the portable terminal 1 and the authentication executing device 2, they are agreed about the secret key, exchanging a secret message. Therefore, it is possible to realize a system capable of keeping the security of the secret information even if the set terminal on the way is managed by a vicious manager.

A third embodiment of the present invention will be described with reference to FIG. 1. In the third embodiment, assume that the content of a file is encrypted lest the file stored on a personal computer (PC) should be read out by the other person. Each user carries his or her own portable terminal 1, where the fingerprint feature data of his or her proper finger and the secret key for use in the file encryption as the secret data not readable in the ordinal way are stored in the user inherent information storing unit 13.

In this case, the PC corresponds to the authentication executing device 2, and the data communication between the portable terminal 1 and the authentication executing device 2 is performed via the infrared rays. When a user tries to encrypt a file of the PC, the user specifies the file and then enters his or her registered fingerprint to the fingerprint sensor 10 of the portable terminal 1. When the sensor 10 receives the fingerprint's image, the fingerprint is checked, the both parties are agreed about a secret key for the communication, and the secret key K2, encrypted by using it, for file encryption is sent from the portable terminal 1 to the PC in the same method as mentioned above.

After decrypting the data in the authentication message decrypting unit 23, the PC uses the secret key K2 and executes the encryption operation of the specified file, by way of example of the user inherent operation. The common key encryption method such as DES is employed for encryption. It is impossible to read out the content of the encrypted file.

When a user tries to decrypt the file on the PC (return the file by releasing the key), the user specifies the encrypted file, and then enters the registered fingerprint to the fingerprint sensor 10 of the portable terminal 1. When the sensor 10 receives the fingerprint's image, the fingerprint is checked in the same way as mentioned above, the both parties are agreed about the secret key for the communication, and the secret key K2, encrypted by using it, for file encryption is sent from the portable terminal 1 to the PC. After decrypting the data in the authentication message decrypting unit 23, the PC uses the secret key K2 and executes the decrypting operation of the specified encrypted file, by way of example of the user inherent operation. Thus, the content of the file is returned to be readable.

According to these operations, only when the correct fingerprint of an authorized user is entered to a specified portable terminal, the decrypting operation is allowed, and the file is decrypted. In this case, unless the correct fingerprint is entered to the portable terminal of the user, the file will not be decrypted, thereby making it possible to keep the content of the file in secret. Further, the terminal is small enough to be portable conveniently.

Although the present invention has been described in the case of using the fingerprint by way of example of biometrics, it is also possible to use the other biometrics (features particular to the individual), with the other biometrics such as palm pattern, face, iris, retina pattern, palm shape, handwriting, voice print, or the like input instead of fingerprints and with a means of extracting the features for matching replaced with the fingerprint sensor and the fingerprint feature extracting unit.

Figure 5:
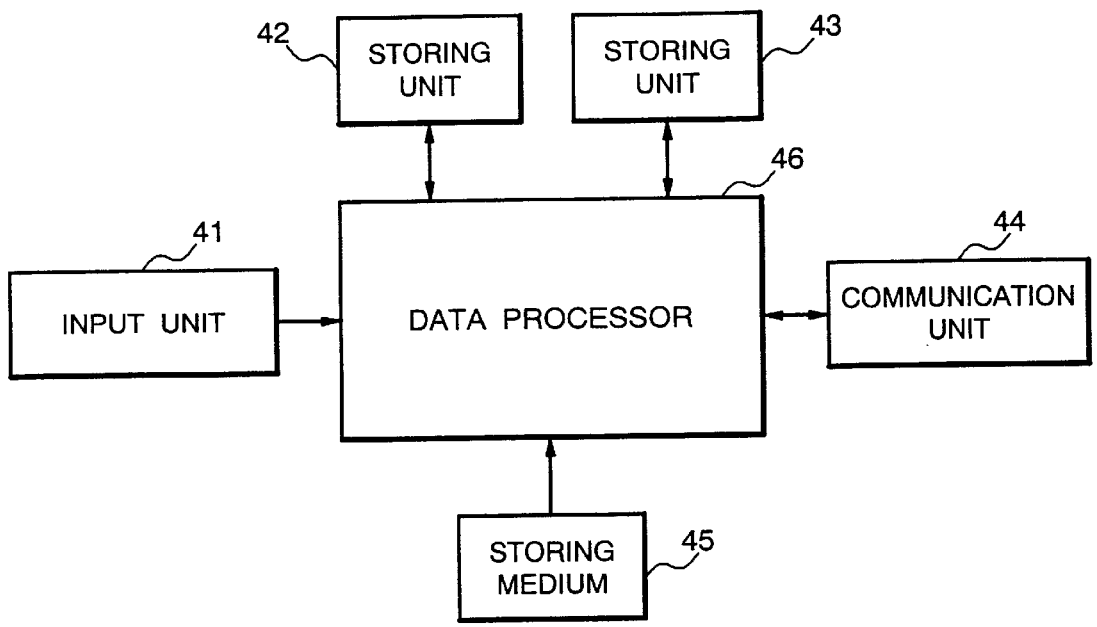
FIG. 5 is a block diagram showing the structure in the case of realizing the portable terminal by using software.

FIG. 5 is a block diagram showing the case of realizing the portable terminal 1 by use of software.

The portable terminal comprises an input unit 41, storing units 42 and 43, a communication unit 44, a storing medium 45, and a data processor 46. The input unit 41 corresponds to the fingerprint sensor 10. The storing unit 42 corresponds to the user inherent information storing unit 13. The storing unit 43 corresponds to the hard disk. The communication unit 44 corresponds to the communication message sending unit 16. The storing medium 45 is a storing medium such as FD (Floppy Disk), CD-ROM, MO (Optical Magnetic Disk), and the like, for storing an authentication program including each unit, excluding the hardware portion of the communication message sending unit 16 of the fingerprint sensor 10 from the components of the portable terminal 1 of FIG. 1 and FIG. 4. The data processor (CPU) 46 reads out the authentication program from the storing medium 45 and writes it into the storing unit 43, thereafter executing the program.

Figure 6:
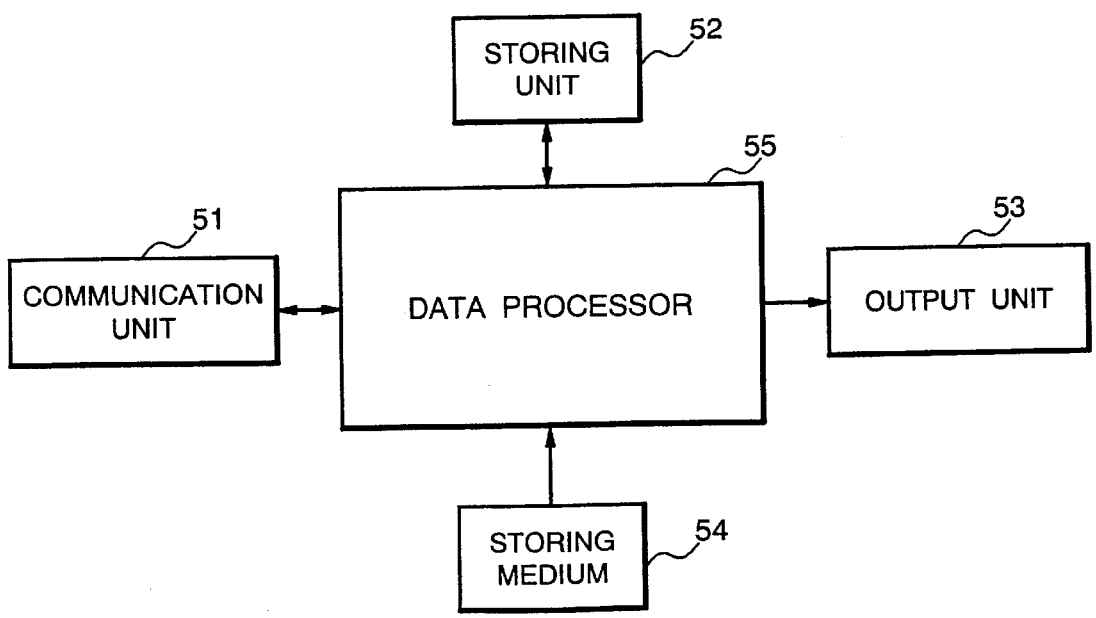
FIG. 6 is a block diagram showing the structure in the case of realizing the authentication executing device by using software.
Figure 7:
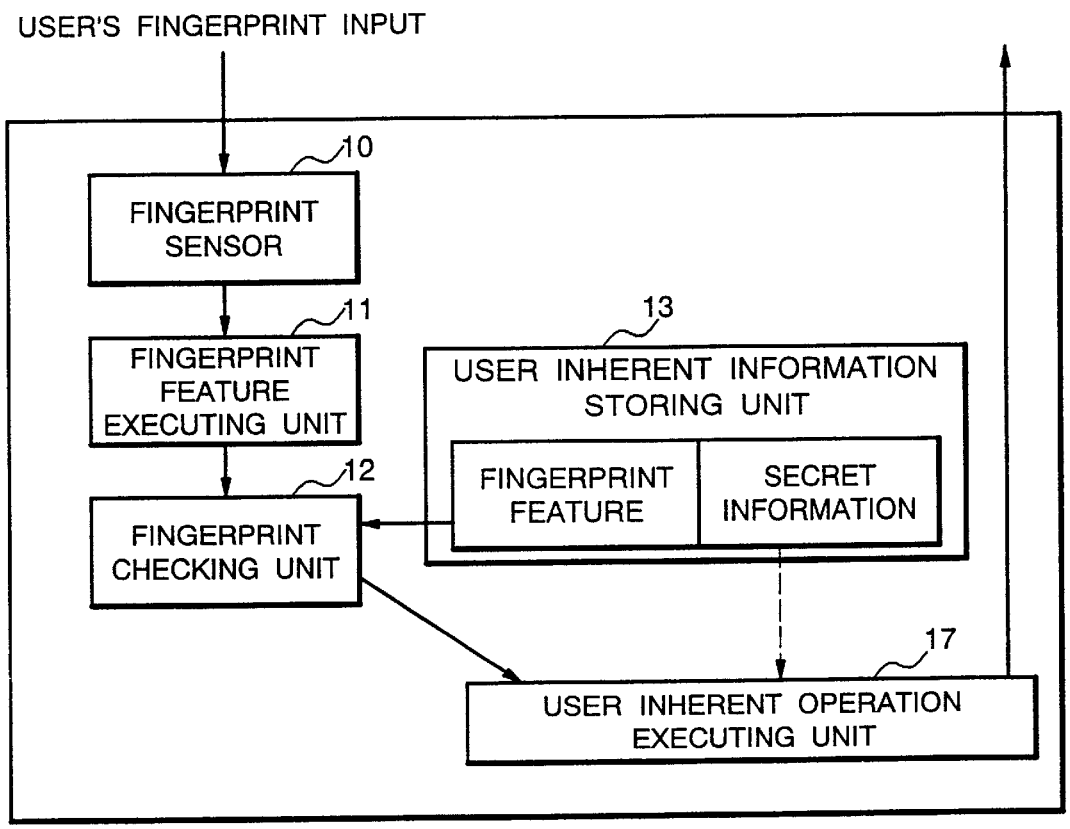
FIG. 7 is a block diagram showing the structure of the conventional authentication system.

FIG. 6 is a block diagram showing the case of realizing the authentication executing device 2 by use of software. The authentication executing device comprises a communication unit 51, a storing unit 52, an output unit 53, a storing medium 54, and a data processor 55. The communication unit 51 corresponds to the communication message receiving unit 21 of FIG. 1 and FIG. 4. The storing unit 52 corresponds to the hard disk. The output unit 53 is an output device for supplying the execution results of the user inherent operation executing unit 24. The storing medium 54 is the same as the storing medium 45, which stores an authentication executing program including each unit, excluding the hardware portion of the communication message receiving unit 21, from the components of the authentication executing device 2 shown in FIG. 1 and FIG. 4. The data processor 55 reads out the authentication executing program from the storing medium 54 and writes it into the storing unit 52, thereafter executing the program.

As set forth hereinabove, the present invention has the following significant effects.

a) By making use of the biometrics identification technique, the present invention can realize an authentication system free from a trouble of remembering a password and also free from a risk that the other person acts like an authorized user.

b) By keeping the biometrics data in a portable terminal under control of a user, and executing the operations of biometrics input, feature extraction, and matching in the portable terminal, the present invention makes it possible to manage the biometrics information easily and prevent from unauthorized access. Further, the portable terminal is decreased in size and weight, so that it is convenient to carry.

c) By establishing the communication between the portable terminal and the authentication executing device by means of the infrared rays, radio waves, and sound waves, the present invention is free from a trouble of connecting them by a cable or inserting a terminal into a PC.

d) Even if the infrared communication is intercepted, it is impossible to read a password because a message is encrypted.

e) Even if the communication content is recorded and reproduced by the other person, it is impossible for the other person to make use of it because a secret key is different every time.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

what is claimed is:

1. An authentication method using biometrics identification, comprising the following steps of:
   identifying a user by biometrics entered from a portable authentication terminal;
   when the user has been registered previously, establishing communication between the authentication terminal and an authentication executing device independent of the authentication terminal, and calculating a common secret key for use in transmission of an authentication message;
   encrypting the authentication message including the user's inherent information based on the secret key in the authentication terminal;
   sending the encrypted authentication message from the authentication terminal to the authentication executing device; and
   decrypting the authentication message based on the calculated secret key in the authentication executing device, thereby executing an operation depending on the user inherent information included in the message.

2. An authentication method using biometrics identification as set forth in claim 1, wherein
   the communication message is transmitted in one of non-contact typed communications, for example, via infrared rays, radio waves, and sound waves.

3. An authentication method using biometrics identification as set forth in claim 1, wherein
   the user inherent information included in the authentication message includes such secret information as cannot be read out without identification of an authorized user from the biometrics in the authentication terminal.

4. An authentication method using biometrics identification as set forth in claim 1, wherein
   an operation to be executed by the authentication executing device depending on the user inherent information is non-executable operation without identification of an authorized user from the biometrics in the authentication terminal, and therefore a function of authenticating that a person having registered the biometrics previously carries and uses the authentication terminal, is provided.

5. An authentication method using biometrics identification as set forth in claim 1, wherein
   the user inherent information included in the authentication message includes individual information that cannot be read out without identification of an authorized user from the biometrics in the authentication terminal, and using the individual information, the authentication executing device executes the operation depending on the information of a user employing the authentication function.

6. An authentication method using biometrics information as set forth in claim 1, wherein
   the operation performed by the authentication executing device depending on the user inherent information includes file encryption and decryption, and a secret key for use in this encryption and decryption is to be stored in such a way that the secret key cannot be read out without identification of an authorized user from the biometrics in the authentication terminal.

7. A portable terminal for authentication using biometrics identification, comprising:
   biometrics image input means for receiving a user's biometrics image;
   biometrics feature extracting means for extracting biometrics feature for matching from the input biometrics image;
   user inherent information storing means for storing the biometrics feature and inherent information of the user in pairs;
   secret key agreeing means for deciding a key for use in encryption of an authentication message between the authentication executing device and the portable terminal;
   biometrics image checking means for comparing the biometrics image extracted from the user's input biometrics image with the biometrics feature stored in said user inherent information storing means, judging whether the user having entered the biometrics image this time is a registered user or not, and when this user is a registered user, supplying the inherent information stored in pairs with the biometrics image in said user inherent information storing means;
   authentication message encrypting means for encrypting the user's inherent information by the decided secret key; and
   communication message sending means for sending a communication message to the authentication executing device.

8. A portable terminal as set forth in claim 7, wherein
   said user inherent information storing means stores the biometrics features and inherent information for a plurality of users.

9. A portable terminal as set forth in claim 7, wherein
   said biometrics image checking means estimates score indicating similarity of the biometrics images, and judges that the user having entered the biometrics image this time is a registered user when the score is higher than a threshold.

10. A portable terminal as set forth in claim 7, wherein
    said user inherent information storing means stores the biometrics features and inherent information for a plurality of users, and
    said biometrics image checking means estimates score indicating similarity of the biometrics images, and judges that the user having entered the biometrics image this time is a registered user when the score is higher than a threshold.

11. A portable terminal as set forth in claim 7, wherein
    said secret key agreeing means creates any random number, sends the random number to the authentication executing device, and calculates the key by use of a secret formula based on the same random number.

12. A portable terminal as set forth in claim 7, wherein
    said user inherent information storing means stores the biometrics features and inherent information for a plurality of users, and said secret key agreeing means creates any random number, sends the random number to the authentication executing device, and calculates the key by use of a secret formula based on the same random number.

13. A portable terminal as set forth in claim 7, wherein
said biometrics image checking means estimates score indicating similarity of the biometrics images, and judges that the user having entered the biometrics image this time is a registered user when the score is higher than a threshold, and
said secret key agreeing means creates any random number, sends the random number to the authentication executing device, and calculates the key by use of a secret formula based on the same random number.

14. A portable terminal as set forth in claim 7, wherein
said secret key agreeing means performs mutual authentication together with the authentication executing device according to a predetermined protocol and countersign prior to deciding the key.

15. A portable terminal as set forth in claim 7, wherein
said user inherent information storing means stores the biometrics features and inherent information for a plurality of users, and
said secret key agreeing means performs mutual authentication together with the authentication executing device according to a predetermined protocol and countersign prior to deciding the key.

16. A portable terminal as set forth in claim 7, wherein
said biometrics image checking means estimates score indicating similarity of the biometrics images, and judges that the user having entered the biometrics image this time is a registered user when the score is higher than a threshold, and
said secret key agreeing means performs mutual authentication together with the authentication executing device according to a predetermined protocol and countersign prior to deciding the key.

17. A portable terminal as set forth in claim 7, wherein
said secret key agreeing means creates any random number, sends the created random number to the authentication executing device, receives the created random number from the authentication executing device, and creates the key by use of the both random numbers.

18. A portable terminal as set forth in claim 7, wherein
said user inherent information storing means stores the biometrics features and inherent information for a plurality of users, and
said secret key agreeing means creates any random number, sends the created random number to the authentication executing device, receives the created random number from the authentication executing device, and creates the key by use of the both random numbers.

19. A portable terminal as set forth in claim 7, wherein
said biometrics image checking means estimates score indicating similarity of the biometrics images, and judges that the user having entered the biometrics image this time is a registered user when the score is higher than a threshold, and
said secret key agreeing means creates any random number, sends the created random number to the authentication executing device, receives the created random number from the authentication executing device, and creates the key by use of the both random numbers.

20. A portable terminal as set forth in claim 7, which
communicates with the authentication executing device by one of non-contact typed communications, for example, via infrared rays, radio waves, and sound waves.

21. A portable terminal as set forth in claim 7, which
communicates with the authentication executing device through another terminal.

22. An authentication system for performing authentication using biometrics identification, having
a portable terminal and an authentication executing device,
said portable terminal including:
biometrics image input means for a user's receiving biometrics image;
biometrics feature extracting means for extracting biometrics feature for matching from the input biometrics image;
user inherent information storing means for storing the biometrics feature and inherent information of the user in pairs;
secret key agreeing means for deciding a key for use in encryption of an authentication message between said authentication executing device and said portable terminal;
biometrics image checking means for comparing the biometrics image extracted from the user's input biometrics image with the biometrics feature stored in said user inherent information storing means, judging whether the user having entered the biometrics image this time is a registered user or not, and when this user is a registered user, supplying the inherent information stored in pairs with the biometrics image in said user inherent information storing means;
authentication message encrypting means for encrypting the user's inherent information by use of the decided secret key; and
communication message sending means for sending a communication message to said authentication executing device,
said authentication executing device including:
secret key agreeing means for deciding a key for use in encryption of an authentication message between said portable terminal and said authentication executing device;
communication message receiving means for receiving a communication message sent from said portable terminal;
authentication message decrypting means for decrypting the communication message by use of the decided secret key; and
user inherent operation executing means for executing the user inherent operation based on the inherent information decrypted from the communication message.

23. An authentication system as set forth in claim 22, wherein
said biometrics image checking means estimates score indicating similarity of the biometrics images, and judges that the user having entered the biometrics image this time is a registered user when the score is higher than a threshold.

24. An authentication system as set forth in claim 22, wherein
said user inherent information storing means of said portable terminal stores the biometrics features and inherent information for a plurality of users, and said biometrics image checking means estimates score indicating similarity of the biometrics images, and judges that the user having entered the biometrics image this time is a registered user when the score is higher than a threshold.

25. An authentication system as set forth in claim 22, wherein said secret key agreeing means of said portable terminal creates any random number, sends the random number to said authentication executing device, and calculates the key by use of a secret formula based on the same random number.

26. An authentication system as set forth in claim 22, wherein said user inherent information storing means of said portable terminal stores the biometrics features and inherent information for a plurality of users, and said secret key agreeing means creates any random number, sends the random number to said authentication executing device, and calculates the key by use of a secret formula based on the same random number.

27. An authentication system as set forth in claim 22, wherein said biometrics image checking means of said portable terminal estimates score indicating similarity of the biometrics images, and judges that the user having entered the biometrics image this time is a registered user when the score is higher than a threshold, and said secret key agreeing means creates any random number, sends the random number to said authentication executing device, and calculates the key by use of a secret formula based on the same random number.

28. An authentication system as set forth in claim 22, wherein said secret key agreeing means of said authentication executing device calculates the key by use of the same secret formula as that of said portable terminal based on the random number sent from said portable terminal.

29. An authentication system as set forth in claim 22, wherein said secret key agreeing means of said authentication executing device receives the random number from said portable terminal, creates any random number, and creates the key by use of the both random numbers.

30. A computer readable memory storing an authentication program for making a computer perform authentication using biometrics identification, the authentication program comprising:
  a biometrics image input step for a user's receiving biometrics image;
  a biometrics feature extracting step for extracting biometrics feature for matching from the input biometrics image;
  a secret key agreeing step for deciding a key for use in encryption of an authentication message between said authentication executing device and said portable terminal;
  a biometrics image checking step for comparing the biometrics image extracted from the user's input biometrics image with the biometrics feature stored in said user inherent information storing means for storing a pair of the biometrics features and inherent information of the user, judging whether the user having entered the biometrics image this time is a registered user or not, and when this user is a registered user, supplying the inherent information stored in pairs with the biometrics image in said user inherent information storing means;
  an authentication message encrypting step for encrypting the user's inherent information by use of the decided secret key; and
  a communication message sending step for sending a communication message to said authentication executing device.

31. A computer readable memory as set forth in claim 30, wherein said biometrics image checking step of said authentication program estimates score indicating similarity of the biometrics images, and judges that the user having entered the biometrics image this time is a registered user when the score is higher than a threshold.

32. A computer readable memory as set forth in claim 30, wherein said secret key agreeing step of said authentication program creates any random number, sends the random number to said authentication executing device, and calculates the key by use of a secret formula based on the same random number.

33. A computer readable memory as set forth in claim 30, wherein said biometrics image checking step of said authentication program estimates score indicating similarity of the biometrics images, and judges that the user having entered the biometrics image this time is a registered user when the score is higher than a threshold, and said secret key agreeing step of said authentication program creates any random number, sends the random number to said authentication executing device, and calculates the key by use of a secret formula based on the same random number.

34. A computer readable memory as set forth in claim 30, storing an authentication executing program of said authentication executing device, the authentication executing program making a computer perform a secret key agreeing step for deciding a key for use in encryption of an authentication message between the authentication program and the authentication executing program;

a communication message receiving step for receiving a communication message sent from the authentication program;

an authentication message decrypting step for decrypting the communication message by use of the decided secret key; and a user inherent operation executing step for executing the user inherent operation based on the inherent information decrypted from the communication message.

35. A computer readable memory as set forth in claim 34, wherein said secret key agreeing step of the authentication executing program calculates the key by use of the same secret formula as that of said portable terminal based on the random number sent from said portable terminal.

36. A computer readable memory as set forth in claim 34, wherein said secret key agreeing step of the authentication executing program receives the random number from said authentication program, creates any random number, and creates the key by use of the both random numbers.

* * * * *